(12) United States Patent
Casanova et al.

(10) Patent No.: US 7,039,313 B2
(45) Date of Patent: May 2, 2006

(54) AUTOMATIC PROTECTION SYSTEM FOR AN OPTICAL TRANSMISSION SYSTEM

(75) Inventors: Mauro Rudi Casanova, Carugate (IT); Pietro Centenari, Montodine (IT); Adriano Nava, Milan (IT)

(73) Assignee: Cisco Photonics Italy S.r.L., Milan (IT)

(*) Notice: Subject to any disclaimer, the term of this patent is extended or adjusted under 35 U.S.C. 154(b) by 146 days.

(21) Appl. No.: 10/434,684

(22) Filed: May 9, 2003

(65) Prior Publication Data

US 2003/0194233 A1 Oct. 16, 2003

Related U.S. Application Data (63) Continuation of application No. 09/473,050, filed on Dec. 28, 1999, now Pat. No. 6,583,899.
(60) Provisional application No. 60/116,239, filed on Jan. 15, 1999.

(30) Foreign Application Priority Data

Dec. 31, 1998 (EP) .............................................. 98124849

(51) Int. Cl.
*H04B 10/08* (2006.01)
*H04B 17/00* (2006.01)

(52) U.S. Cl. .......................................... 398/18; 398/15
(58) Field of Classification Search ................ 398/15, 398/18, 37, 157, 177
See application file for complete search history.

(56) References Cited

U.S. PATENT DOCUMENTS

| | | | |
|---|---|---|---|
| 5,278,686 A | 1/1994 | Grass et al. ............... | 359/110 |
| 5,317,660 A | 5/1994 | Keith ......................... | 385/24 |
| 5,355,250 A | 10/1994 | Grasso et al. .............. | 359/341 |
| 5,428,471 A | 6/1995 | McDermott ................. | 359/177 |
| 6,344,915 B1 | 2/2002 | Alexander et al. .......... | 359/134 |
| 6,359,708 B1 | 3/2002 | Goel et al. .................. | 359/110 |
| 6,359,713 B1 * | 3/2002 | DeCusatis et al. .......... | 398/178 |
| 6,504,630 B1 * | 1/2003 | Czarnocha et al. .......... | 398/15 |
| 6,583,899 B1 * | 6/2003 | Casanova et al. ............. | 398/9 |

FOREIGN PATENT DOCUMENTS

| | | |
|---|---|---|
| EP | 0 506 163 | 9/1992 |
| GB | 2 322 027 | 8/1998 |
| WO | WO 97/12454 | 4/1997 |
| WO | WO 98/25361 | 6/1998 |

OTHER PUBLICATIONS

ITU–T G.681, "Functional Characteristics of Interoffice and Long–Haul Line Systems Using Optical Amplifiers, Including Optical Multiplexing", Oct. 1996, pp. 21–24.*

(Continued)

*Primary Examiner*—M. R. Sedighian
*Assistant Examiner*—Shi K. Li
(74) *Attorney, Agent, or Firm*—Baker Botts L.L.P.

(57) ABSTRACT

An optical communication system and method for starting up and shutting down the system to ensure safety during repair of a fiber break are disclosed. A technique for shutting down an optical communication system having spans of optical transmission fiber interspersed serially between optical transformation sites and a plurality of amplifier sites includes shutting down both amplifiers on either side of a fiber disruption and both amplifiers in the same amplifier sites serving transmission in an opposite direction, followed by deactivation of all amplifiers within the same optical line between optical transformation sites. During startup, amplifiers enter an operating mode to ignore a system shutdown signal, an amplifier at a terminal site is forced on, and then successive amplifiers step through an intermediate safe power level before reaching full operating power.

34 Claims, 5 Drawing Sheets

OTHER PUBLICATIONS

Hairdo Oji; "Optical Repeater Station and Optical Terminal Station", Patent Abstracts of Japan, vol. 017, No. 202 of JP 04 345219 (Dec. 1, 1992).

Kanebou Kenji: "Two–Way Optical Communication System", Patent Abstracts of Japan, vol. 010, No. 082 of JP 60 229433 (Nov. 14, 1985).

International Telecommunication Union, "Digital Line Systems Based on the Synchronous Digital Hierachy For Use on Optical Fibre Cables", ITU–T Recommendation G.958, pp. 19–21 (1994).

International Standard, "Safety of Laser Products—Part 1: Equipment Classification, Requirements and User's Guide", CEI/IEC 60825–1, Edition 1, pp. 49, 51, 53, 55, 57, 59, 61 and 63, 1997.

International Standard, "Safety of Laser Products—Part 2: Equipment Classification, Requirements and User's Guide", CEI/IEC 825–2, First Edition 1, pp. 9, 11, 17, 19 and 29 (1993).

T. Tokure et al.; "Quantitative Analysis of Optical Surge Propagation on Transmission Systems", IOOC–ECOC97, vol. 3, Conference Publicaion No. 448, pp. 263–266 (1997).

P. Bonanni et al.: "Automatic Line Protection Testing: SDH Equipment With Optical Fibre Amplifier Systems", IEEE Instrumentation and Measurement Technology Conference, vol. 3, pp. 1397–1399 (1994).

Chung–Sheng Li et al.: "Fault Detection, Isolation and Open Fiber Control in Transparent All–Optical Networkd", 1996 IEEE, pp. 157–162; Publication date Nov. 18, 1996.

\* cited by examiner

AUTOMATIC PROTECTION SYSTEM FOR AN OPTICAL TRANSMISSION SYSTEM

CROSS-REFERENCE TO RELATED APPLICATIONS

This application is a continuation of U.S. patent application Ser. No. 09/473,050 filed Dec. 28, 1999 and entitled "AUTOMATIC PROTECTION SYSTEM FOR AN OPTICAL TRANSMISSION SYSTEM", now U.S. Pat. No. 6,583,899.

This application is based on European Patent Application No. 98124849.5 filed on Dec. 31, 1998 and U.S. Provisional Application No. 60/116,239 filed on Jan. 15, 1999, the content of which is incorporated herein by reference.

TECHNICAL FIELD OF THE INVENTION

This invention relates in general to optical communication, and more particularly to an automatic protection system for an optical transmission system.

BACKGROUND OF THE INVENTION

The present invention relates to a method and system for safely shutting down and starting up an optical communication line that includes optical fiber amplifiers. In particular, the present invention relates to a technique for ensuring that light signals emanating from fiber amplifiers in an optical communication line remain at a safe level during system maintenance or shut down.

Optical communication systems conventionally involve the transmission of light signals across a distance of optical fiber between a transmitter terminal and a receiver terminal. For transmission across at least several tens of kilometers, amplification of the light signals occurs to offset attenuation within transmission optical fibers and intermediary equipment. One technique for amplifying light signals uses opto-electronic regenerators within the optical path to convert the light to an electrical signal, amplify and re-shape the electrical signal, and then convert the electrical signal back to optical form.

Modern optical systems employ amplifiers of optical fibers doped with rare-earth elements, such as erbium. These fiber amplifiers generate a significant amount of optical power within an optical fiber under normal operating conditions. Fiber amplifiers in general operate by exciting ions of the rare-earth dopant with a characteristic pump wavelength so that the excited ions transfer energy to optical signals passing through the amplifier at a different characteristic wavelength. For erbium-doped fiber amplifiers, a characteristic pump wavelength is about 980 nm or 1480 nm, and a characteristic transmission wavelength is about 1550 nm.

If a disruption in a fiber line occurs, however, the fiber amplifiers can cause high levels of optical power, which can be harmful to the human eye, to emanate from the fiber into the surrounding environment. Such a disruption can arise from an accidental break in a section of the transmission line or by a purposeful disconnection of the line during system maintenance or repair. In either event, care must be taken to protect against directing emission of light from the fiber into a person's eyes.

Several documents have considered how to avoid the emission of high levels of optical power from the end of a disrupted fiber. U.S. Pat. No. 5,278,686 and U.S. Pat. No. 5,355,250, for example, disclose techniques for shutting down an entire optical communication line in the event of a fiber break. The shutdown can occur by disabling the source of optical signals at the transmitter or by disabling the pump source for the fiber amplifiers along the line.

In the '686 patent, a bidirectional optical fiber system has two terminals that each have a transmitter and a receiver for the respective opposite transmission directions in the system. The transmitter and receiver in each terminal are interconnected by a protective device that deactivates the transmitter when the associated receiver does not receive an optical signal. Each amplifier in the system also includes a device that detects the presence of passing light signals at the amplifier and interrupts the line when the light energy drops below a predetermined level. A fiber break will cause each amplifier in a transmission chain to shut down sequentially until the entire system is disabled. Conversely, repair of the fiber will cause the cascaded amplifiers to start up sequentially as they detect the rise in signal power. Similarly, the '250 patent discloses a device that detects a loss in optical power upstream of a fiber amplifier and then reduces or eliminates the emission from the amplifier by shutting down the pump source for the amplifier.

U.S. Pat. No. 5,428,471 and ITU Recommendation G.958 disclose a technique of interlocking amplifiers surrounding a fiber break. The interlock occurs by communicating failure information between amplifiers at a common site that serve lines traveling in opposite directions. As shown in FIG. 1 of the '471 patent, a disruption to fiber 14 at location "A" is detected by amplifier 40b due to a drop in optical input power, which causes amplifier 42a within fiber 16 to shut down or reduce its output power to a safe level. Shut down of amplifier 42a is similar to a cable disruption at location "8" in cable 16 and is detected by amplifier 42b, which causes amplifier 40a to shut down. As a result, optical energy at location "A" is terminated. The '471 patent explains that for the interlock of amplifiers in a two-way system, only two amplifiers (42a and 40a) are disabled, and amplifiers not located adjacent to the fiber disruption remain operative.

The '471 patent further discloses a continuity signal of a safe power level generated on fibers 14 and 16 at the output of each of the amplifiers that is used to sense fiber disruption. The amplifiers also use the continuity signal to sense repair of the break to actuate communication along the previously disrupted line.

WO 98/25361 discloses a fiber amplifier with a pump unit that provides a nominal, continuous pump power in an operational state but changes its mean pump power in a safety state to give a pulsed signal with a power below a prescribed safety limit. Upon startup, the pump unit in WO 98/25361 will first assume a safety state to verify that re-connection to the fiber amplifier has occurred, then the unit will escalate to an intermediate power state until the system receiver obtains a transmission signal. Thereafter, the pump unit raises its power to the full operational condition.

Applicants have observed that shutting down individual amplifiers in an optical transmission system in cascade as suggested in the '686 patent and the '250 patent may take too long to isolate a fault. Under current international standards such as IEC 60825-2, when an optical cut occurs an optical safety circuit with a reasonable reliability has to reduce the optical power to a predetermined level in the direction toward the fiber cut within 1 second.

Also, Applicants have observed that an amplifier interlock system as suggested in the '471 patent and ITU Recommendation G.958, which deactivates only one amplifier in each transmission direction, allows amplified spontaneous emission (ASE) noise to accumulate within the remaining activated amplifiers. Subsequent insertion of an optical signal to the activated amplifiers can result in optical pulses of very high peak power, which may endanger connectors or photodiodes within the line.

Some publications have recognized a condition of large pulses with optical amplifiers. For example, an article by Tokura et al. entitled "Quantitative Analysis of Optical Surge Propagation on Transmission Systems," IOOC-ECOC '97, Vol. 3, pp. 263–66 (1997) investigates optical surges in fiber amplifiers having a large gain. This article, however, concludes that a maximum value of optical surge can be suppressed by regulating the switching time constants of an input signal and concludes that a system is safe from optical surge propagation when a switching speed of 10 μsec or slower is used for a signal input.

Also, U.S. Pat. No. 5,317,660 discloses an optical transmission system with an optical filter for providing protection against giant pulses that may develop from a fiber break. As explained in this patent, though, the giant pulses are caused by reflection of spontaneous emission at the point of the fiber break, and the use of optical isolators avoids the reflection of light back through the amplifier and the subsequent emission of giant pulses.

SUMMARY OF THE INVENTION

Applicants have discovered a technique for efficiently and safely shutting down and starting up an optical communication line after a fiber break has occurred and then been repaired when supervisory control exists over the amplifiers rather than the transmitter and receiver. In particular, Applicants have observed that providing an interlock of optical amplifiers surrounding a fiber break best takes place when all four amplifiers in both amplifier sites upstream and downstream from the fiber break are deactivated rather than just the amplifier upstream from the break and in the downstream amplifier site for the opposite transmission direction. Also, Applicants have discovered that subsequently shutting down all amplifiers with an optical line section bounded by optical transformation sites, which switch optical transmission signals to electrical signals, avoids the release of dangerous large optical pulses of amplified spontaneous emission during a subsequent start-up phase. Additionally, Applicants have seen that a staged start-up of an optical communication system with an override of shutdown commands, with reduced power conditions, and timed delays to ensure quiescent conditions leads to safe operation of the system.

In one aspect, a method consistent with the present invention shuts-down an optical communication system having spans of optical transmission fiber interspersed serially between optical transformation sites and a plurality of amplifier sites containing eastbound and westbound optical amplifiers, where the optical transformation sites are selected from a group comprising a transmitter, an add/drop multiplexer, an opto-electronic regenerator, and a receiver. The method includes the steps of detecting a drop in signal power of an eastbound optical signal below a threshold at an input to an eastbound optical amplifier in a first amplifier site and decreasing pump power for the eastbound optical amplifier below a predetermined safety level; decreasing pump power for a corresponding westbound optical amplifier in the first amplifier site below the predetermined safety level; detecting a drop in signal power of a westbound optical signal below the threshold at an input to a downstream westbound optical amplifier in a second amplifier site immediately downstream from the first amplifier site and decreasing pump power for the downstream westbound optical amplifier below the predetermined safety level; and decreasing pump power for a corresponding eastbound optical amplifier in the second next amplifier site below the predetermined safety level. Also, the method includes decreasing pump power for only all other westbound and eastbound optical amplifiers positioned between the first amplifier site and a next upstream optical transformation site and between the second amplifier site and a next downstream optical transformation site.

In another aspect, a method consistent with the present invention starts-up a deactivated optical line within an optical communication system, where the optical line has spans of optical transmission fiber positioned between two optical transformation sites and interspersed serially between a plurality of amplifier sites containing eastbound and westbound optical amplifiers. Booster amplifiers are located within amplifier sites positioned immediately downstream from the optical transformation sites, and optical line amplifiers are located within amplifier sites other than the amplifier sites immediately downstream from the optical transformation sites.

The method of the second aspect includes forcing the deactivated booster amplifier to operate in a reduced power condition for a first predetermined length of time. As well, the second method includes detecting an increase in signal power above a predetermined threshold at an input to a first of the deactivated optical line amplifiers positioned immediately downstream from the booster amplifier; operating the first of the deactivated optical line amplifiers in the reduced power condition; operating in the reduced power condition each successive optical line amplifier in cascade downstream from the first of the optical line amplifiers; and after a second predetermined length of time, operating the booster amplifier and the optical line amplifiers in a full power condition responsive to the shutdown command.

In a third aspect, a supervisory control system for an optical communication line consistent with the present invention includes detection circuitry coupled to the optical amplifiers for detecting an input power level for optical signals, control circuitry for causing amplifiers surrounding a fiber break recognized by the detection circuitry to shut off and for then causing all other optical amplifiers in the optical communication line to shut off; and timing circuitry for delaying any change in operational status of the optical amplifiers for predetermined lengths of time after the optical amplifiers have shut off and after input power is first detected by the detection circuitry.

It is to be understood that both the foregoing general description and the following detailed description are exemplary and explanatory only and are not restrictive of the invention as claimed. The following description, as well as the practice of the invention, set forth and suggest additional advantages and purposes of this invention.

BRIEF DESCRIPTION OF THE DRAWINGS

The accompanying drawings, which form part of the detailed description, show embodiments of the invention and, together with the description, explain the principles of the invention.

DETAILED DESCRIPTION OF THE DRAWINGS

Reference will now be made to various embodiments according to this invention, examples of which are shown in the accompanying drawings and will be obvious from the description of the invention. In the drawings, the same reference numbers represent the same or similar elements in the different drawings whenever possible.

The present invention provides an automatic protection system for an optical communication system for avoiding hazardous conditions for workers when repairing breaks in optical fiber lines. The technique of this invention enables a rapid isolation of a fiber break with an interlock of surrounding amplifiers and subsequently shuts down an entire affected optical line section between two optical transformation sites, such as a transmitter, a receiver, an add/drop multiplexer, or an opto-electrical regenerator. As well, the present technique provides a startup routine for re-establishing optical communications after the shutdown of the optical system. This routine permits the release of interlocked amplifiers and a low-power start stage regardless of a system shutdown command to achieve a restart of the communication system by manually powering one booster amplifier in the system.

In accordance with one embodiment consistent with the present invention, a method shuts down an optical communication system that has spans of optical transmission fiber interspersed serially between optical transformation sites and a plurality of amplifier sites containing eastbound and westbound optical amplifiers, where the optical transformation sites are selected from a group comprising a transmitter, an add/drop multiplexer, an opto-electronic regenerator, and a receiver. The method includes the steps of detecting a drop in signal power at an input to an eastbound optical amplifier, decreasing pump power for the eastbound optical amplifier, decreasing pump power for a corresponding westbound optical amplifier, detecting a drop in signal power at an input to a downstream westbound optical amplifier, decreasing pump power for the downstream westbound optical amplifier, decreasing pump power for a corresponding eastbound optical amplifier, and decreasing pump power for only all other westbound and eastbound optical amplifiers positioned between the decreased amplifiers and the next adjacent optical transformation site.

Figure 1:
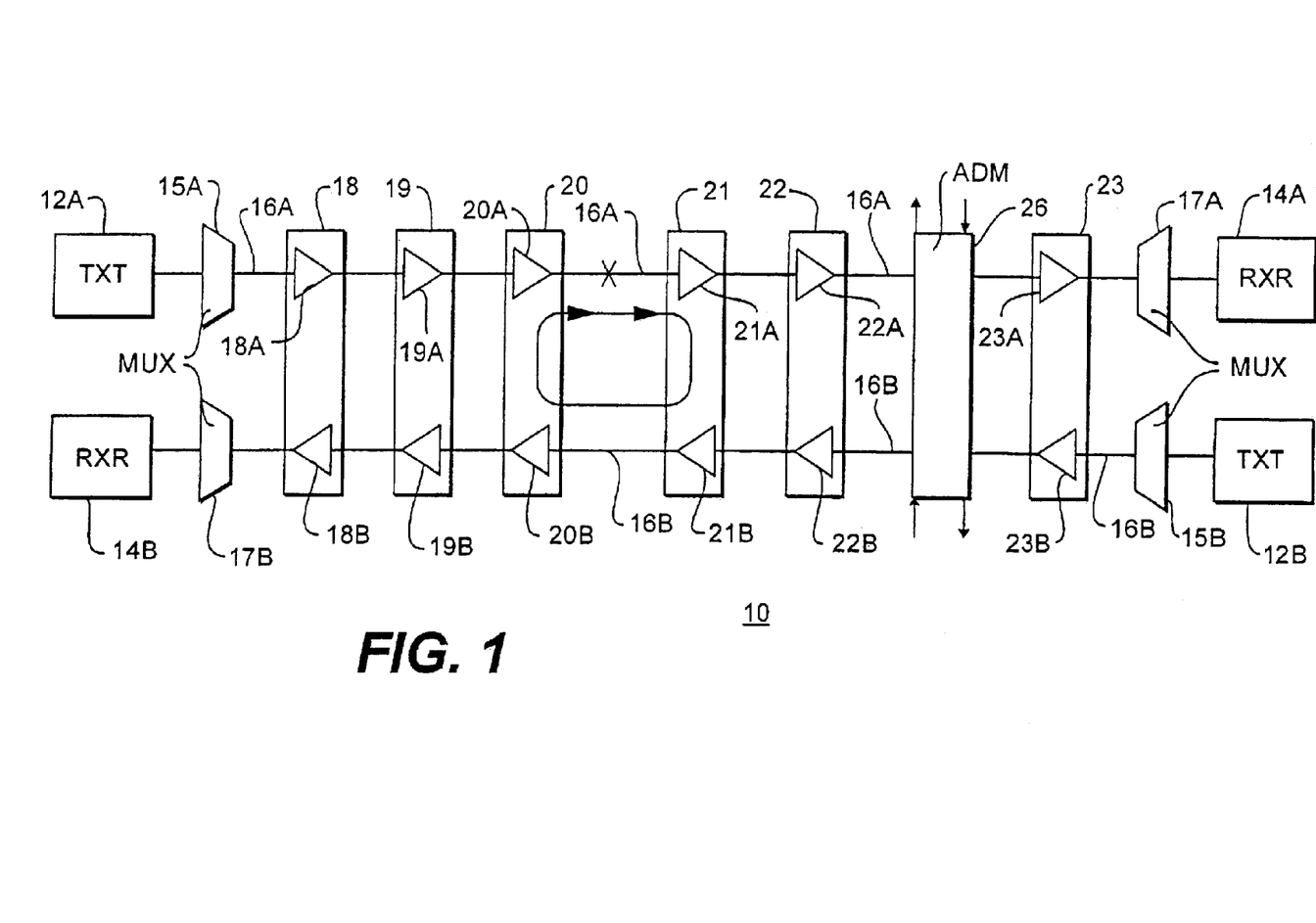
FIG. 1 is schematic diagram of an optical communication system for implementing one embodiment of the present invention.

Generally embodied as 10 in FIG. 1, an optical communication system in accordance with the present invention typically is a wavelength-division-multiplexing system for transmitting a plurality of optical channels along a single optical fiber. In a system such as 10, telecommunication signals exist predominantly in the optical domain, but periodically are transformed to the electrical domain and vice versa. For instance, optical communication system 10 may receive telecommunication signals from an external system, such as a local telephone or data switching network, in the form of electrical pulses. System 10 contains the ability to convert the electrical pulses to optical carrier wavelengths and to transmit the converted optical signals across long distances of optical telecommunication fiber. As explained further below, system 10 may periodically reconvert the telecommunication signals to an electrical form, for example, for switching or processing, during the long-distance transmission.

Optical communication system 10 for using the method of the present invention includes transmitters TXT 12A and 12B for originating WDM optical signals to be received eventually by receivers RXR 14A and 14B. For purposes of discussion, the chain of components in the optical path between TXT 12A and RXR 14A are referred to as components within the eastbound path or the eastbound direction, while the chain of components in the optical path between TXT 12B and RXR 14B are referred to as components within the westbound path or the westbound direction. Of course, eastbound and westbound designations could alternatively apply to the opposite optical paths instead.

In a conventional manner, TXT 12A and 12B may receive telecommunication signals from external networks and use the telecommunication signals to modulate optical carrier signals for transmission through system 10. The optical carrier wavelengths typically correspond to a predetermined grid of wavelengths that may span, for example, about 1530 nm to about 1565 nm, or up to about 1600 nm. The number of optical carrier wavelengths used by TXT 12A and 12B may vary from system to system, but often employ on the order of 8, 16, 32, 64 or 12B channels, for example. TXT 12A and 12B provide sufficient optical power to launch the modulated optical channels through multiplexers 15A and 15B, where the plurality of channels with separate carrier wavelengths are combined into a single optical fiber 16A and 16B. At the opposite end of the fiber spans, demultiplexers 17A and 17B separate the plurality of channels from the single optical path for detection by RXR 14A and 14B.

Fiber 16A and 16B may include various types of optical communication fiber such as standard single-mode fiber, dispersion-shifted fiber, non-zero-dispersion or other types commonly known to one of ordinary skill in the art. Despite the type of fiber 16A and 16B used in system 10, attenuation and degradation of the optical signals inevitably occurs after transmission across a substantial distance within fiber 16A and 16B. Consequently, system 10 includes at least one amplifier site for overcoming the attenuation and degradation of the optical signals.

FIG. 1 shows exemplary amplifier sites 18–23. Each amplifier site includes an optical amplifier for each direction of transmission in system 10, that is, one for transmission from TXT 12A to RXR 14A such as optical amplifier 18A in amplifier site 18 together with optical amplifier 18B for amplifying optical signals traveling from TXT 12B to RXR 14B. Preferably, the pair of optical amplifiers 18A and 18B reside at a common location or site within system 10. This common location simplifies supervisory, maintenance, and control functions for the optical system. Likewise, the amplifiers for the two directions of transmission each reside at the same general location within amplifier sites 19–23, respectively. Although FIG. 1 shows a single optical amplifier for each direction at an amplifier site such as 18, amplifier site 18 may include numerous other optical and electrical circuits for improving the optical signals and monitoring the performance of system 10. For example, amplifier site 18 may include a dispersion-compensating module (not shown) for countering chromatic dispersion of optical pulses that occurs from passage through fiber 16A. As well, optical amplifiers such as 18A may include several discrete amplifiers that operate collectively at site 18 to boost the optical signals.

The optical amplifiers within sites 18–23 are preferably rare-earth-doped fibers. These well-known amplifiers include a rare earth dopant that is usually erbium within their cores that becomes excited when pumped with a characteristic wavelength of light. For erbium, a standard pump wavelength is either 980 nm or 1480 nm. The pump sources (not shown) for fiber amplifiers 18A–23A and 18B–23B are preferably laser diodes that inject a pump wavelength of 980 nm or 1480 nm in a co-propagating or counter-propagating direction to the transmission of the optical signals. As is readily known to one of ordinary skill in the art, the amount of pump power at the characteristic pumping wavelength provided to the erbium-doped fiber amplifier, together with the physical and material characteristics of the particular fiber amplifier, dictate the amount of gain provided by the amplifier and the amount of optical power generated at the output of the fiber amplifier.

As mentioned, optical communication system 10 includes optical transformation sites that may convert the optical communication signals to electrical signals. For example, add/drop multiplexer (ADM) 26 may be included within the chain of transmission fiber spans 16A and 16B. ADM 26, which in dense WDM systems may be an optical ADM, functions to switch and route communication signals traveling on fiber 16A or 16B from optical communication system 10 to another communication system or network. Similarly, ADM 26 functions to add new signals to communication system 10 from other systems not shown. Accordingly ADM 26 modifies a multiwavelength (WDM) signal pattern in that it adds and/or drops one or more signals from the pattern. Furthermore, ADM 26 may convert an incoming electrical signal to an optical signal in a similar fashion to TXT 12A and 12B, or ADM 26 may convert an optical signal traveling on fiber 16A or 16B to an electrical signal for use by an external electrical switching system.

A device within optical communication system 10 that may also cause conversion of a telecommunication signal between the optical and electrical domains is an opto-electrical regenerator (not shown). Conventional opto-electronic regenerators perform amplification and reshaping of optical pulses. Opto-electronic regenerators convert the optical signals received from fiber 16A or 16B to an equivalent electrical signal, perform filtering or shaping and/or retiming on the electrical signal, and then reconvert the electrical signal to a boosted optical signal for further transmission along fiber 16A or 16B. Overall, devices such as TXT 12A and 12B, RXR 14A and 14B, ADM 26, and opto-electronic regenerators (not shown) comprise a group of optical transformation sites that convert the telecommunication signals from the optical domain to the electrical domain.

The optical transformation sites define an optical line within system 10. By the optical line it is meant the section of system that transmits the WDM telecommunication signals in a purely optical form and without changes to the WDM pattern. The ends of the optical line are defined by optical transformation sites, such as a transmitter, a receiver, an ADM, or an opto-electronic regenerator. It is understood that other devices not listed above that transform the optical signal to an electrical signal or modify the WDM signal pattern also comprise an optical transformation site.

In optical communication system 10, a distinction is made between amplifiers positioned immediately downstream from terminal sites and amplifiers positioned within line sites. Typically, and for purposes of discussion, "terminal site" amplifiers positioned immediately downstream from an optical transformation site include booster amplifiers. Referring to FIG. 1, terminal amplifier site 18 includes booster amplifier 18A for optical signals traveling in the eastbound direction. Likewise, terminal amplifier site 22 includes booster amplifier 22B positioned immediately downstream from ADM 26. In contrast, amplifier sites within an optical line other than the amplifier sites immediately downstream from the optical transformation sites include optical line amplifiers. For example, line amplifier sites 19, 20, and 21 in FIG. 1 include optical line amplifiers 19A, 20A, and 21A for signals in the eastbound direction and optical line amplifiers 21B, 20B, and 19B in the westbound direction.

According to prevailing international standards, such as IEC 60825-2, severe safety precautions are required to protect service personnel from hazardous conditions when servicing a break in optical fiber 16A or 16B. Such a situation exists with amplifiers of Class 3B (as defined by IEC 60825-1) that operate with output power levels between 50 mW and 500 mW with wavelengths in the window of 1550 nm. If a fiber cut occurs in such a system, an optical safety circuit must reduce the optical power level to a safe operation corresponding to Class 1, that is, below 10 mW (10 dBm). This power reduction must occur within one second after the failure in optical fiber 16A or 16B. Referring to FIG. 1, a break at location "X" in fiber 16A requires a decrease in optical power below 10 mW for signals leaving amplifier site 20 within one second.

Figure 2A:
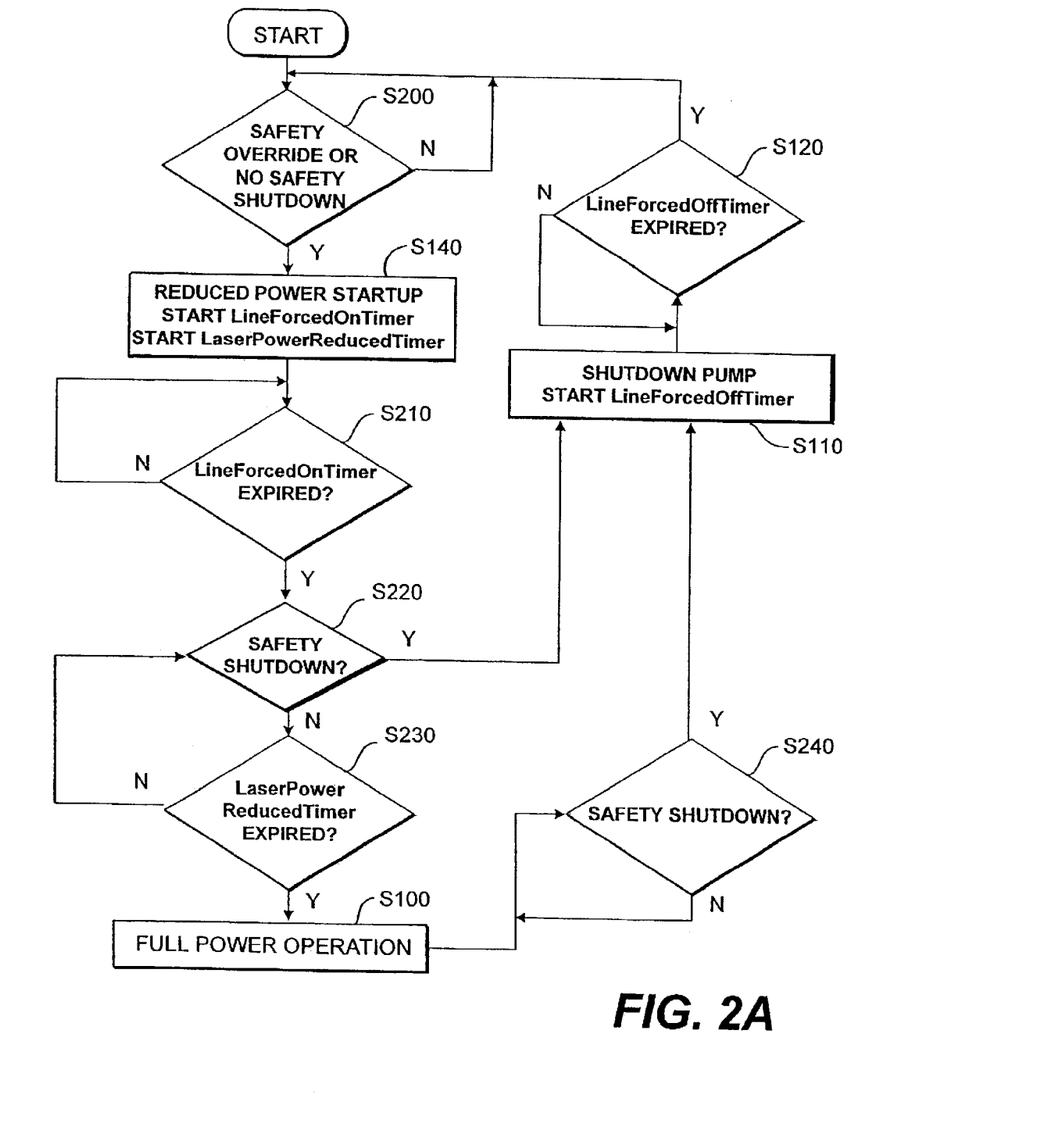
FIG. 2A is a flowchart of a method for starting-up and shutting-down terminal site amplifiers within the optical communication system of FIG. 1 consistent with an embodiment of the present invention.
Figure 2B:
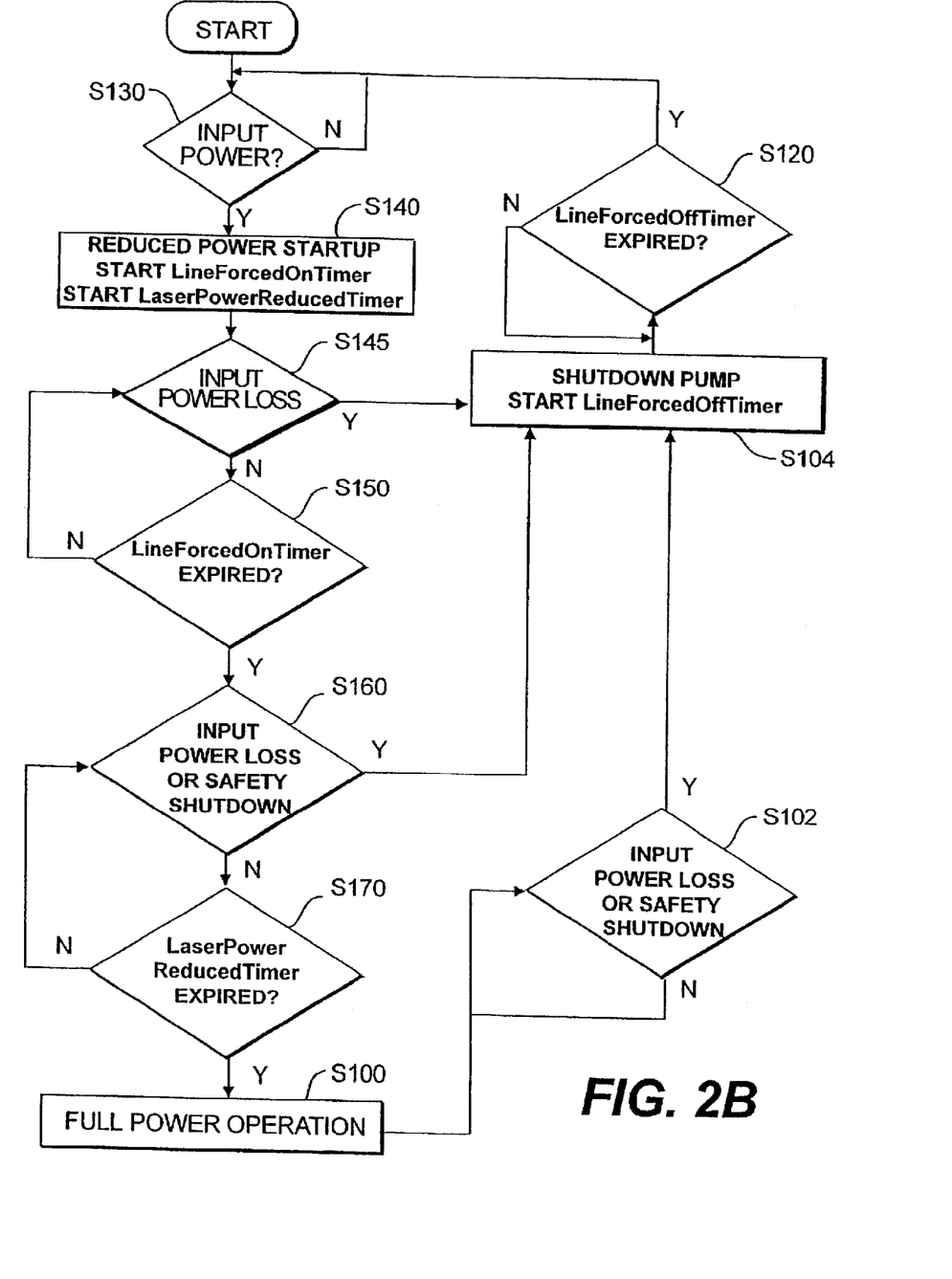
FIG. 2B is a flowchart of a method for starting-up and shutting-down optical line site amplifiers within the optical communication system of FIG. 1 consistent with an embodiment of the present invention.

FIG. 2A illustrates a flowchart for the operation of terminal site amplifiers within communication system 10 during startup, operation, and shutdown. FIG. 2B illustrates a flowchart for the operation of line site amplifiers within communication system 10 during startup, operation, and shutdown.

The present invention contemplates the use of system-level control signals communicated along a bus structure between amplifier units in amplifier sites. These control signals, generated for instance by monitor and control circuit 44 in FIG. 3, derive operating information from individual amplifiers and instruct those amplifiers whether to change their operating mode. TABLE 1 lists several exemplary control signals for use in system 10.

TABLE 1

| CONTROL SIGNAL | DEFINITION |
| --- | --- |
| PowerInput | active if Input Power is detected |
| PowerInputLoss | active when loss of Input Power has occurred for more than PowerInputLoss Timer |
| PowerInputLossTimer | the minimum time Input Power has to stay absent before a PowerInputLoss signal becomes active |
| SafetyShutdown | active when PowerInputLoss has been detected by an amplifier |
| SafetyOverride | manual command used to force the laser pump on even when no Input Power is detected |
| LineForcedOnTimer | the time T that amplifiers ignore the SafetyShutdown command (for instance: time needed by amplifiers to turn on the laser pump, multiplied the number of amplifiers in the line, 100 ms × 28 = 2.8 s, this timer must be greater than 3 s) |
| LineForcedOffTimer | the time $T_2$ that the amplifiers stay off after output power shutdown (for instance: time needed by amplifiers to shut down the |

TABLE 1-continued

| CONTROL SIGNAL | DEFINITION |
| --- | --- |
| | output power) × (number of amplifiers in the line) 60 ms × 28 = 1.68 s, this timer must be greater than 2 s); |
| LaserPowerReducedTimer | the time $T_3$ that the output power of a pump laser is maintained to a reduced value (class 1 or 3A) |

In the present invention, terminal site amplifiers and optical line amplifiers follow slightly different protocols in starting-up and shutting-down. A difference arises, in part, because terminal site amplifiers always have input power provided to them. For example, amplifier 18A within terminal site 18 receives a constant supply of optical input power from transmitter 12A, while line amplifier 21A within line site 21 will lose its optical input power due to disruption at location X. Consequently, terminal site amplifiers will shutdown when they receive a command from a supervisory and control system indicating a fault at a location downstream from the terminal site (for purposes of discussion called a SafetyShutdown command), indicated as S240 and S110 in FIG. 2A. After a predetermined period of time (for purposes of discussion called LineForcedOffTimer) after shutdown indicated by S120, a terminal site amplifier can restart only upon the deactivation of the external SafetyShutdown command or receipt of a command from the supervisory control system indicating that the terminal site amplifier should disregard the SafetyShutdown command and operate (for purposes of discussion called a SafetyOverride command). S200 in FIG. 2A depicts this general step. A more detailed startup procedure for the terminal site amplifiers is explained below.

Optical line amplifiers, on the other hand, may lose optical input power upon a fiber disruption. If no input power is detected by an optical line amplifier (in a manner described below) after it is operating or the optical line amplifier receives a SafetyShutdown command, the optical line amplifier will shutdown, as depicted at S102 and S104 in FIG. 2A. After LineForcedOffTimer expires, the optical line amplifier will ignore any external SafetyShutdown command and will switch on if optical input power is received, as shown at S120 and S130 in FIG. 2B.

The optical line amplifier will continue to ignore any external SafetyShutdown command after switching on for a predetermined period of time, which for purposes of discussion is called LineForcedOnTimer. A more detailed startup procedure for the optical line amplifiers is explained below.

Concerning shutdown of system 10, in accordance with the present invention, a method of shutting down optical communication system 10, includes (FIG. 2C) a step S102 of detecting a drop in signal power below a threshold at an input to eastbound optical amplifier 21A in amplifier site 21 and decreasing pump power for eastbound optical amplifier 21A below a predetermined safety level as in step S104. In a preferred arrangement of the present invention, the communication signals themselves traveling within fiber 16A are used for failure detection within optical line amplifiers. Referring to FIG. 3, an exemplary arrangement for fiber amplifier 21A is shown. This amplifier within site 21 includes an optical coupler 40A that separates a small fraction of the input optical power traveling on line 16A within the signal wavelength band to a photodiode 42A. A supervisory and control circuit 44 coupled to photodiode 42A compares the optical power level sampled from fiber 16A with a predetermined threshold value. It will be understood by those of ordinary skill in the art that supervisory and control circuit 44 may be implemented in various forms, including a discrete local circuit provided at each amplifier, a circuit provided for at each amplifier site for serving all amplifiers within that site, or a centralized circuit for system 10 that monitors and controls each amplifier over a communication bus or similar apparatus. An indication by electronic circuit 44 that the optical power on line 16A has fallen below a predetermined threshold will trigger a signal within the supervising and controlling circuitry 44 of system 10 to indicate that a fiber disruption has occurred upstream from amplifier site 21. The predetermined threshold value in implementation will depend on the type of amplifier used and the overall system configuration, but a typical value may be on the order of –20 dBm.

Next, supervisory and control circuit 44 waits for a predetermined period of time to see if the input signal level for amplifier 21A rises above the predetermined threshold. Supervisory and control circuit 44 waits for a period of time of at least 40 ms determined by a timer, which in a preferred embodiment may be called PowerInputLossTimer. This delay ensures that system 10 does not embark on a shutdown procedure when transient dips in the input power occur rather than permanent line failures. If the predetermined delay expires and input power to amplifier 21A still remains below the predetermined threshold value, supervisory and control circuit 44 causes pump source 46A to shut off or decrease its power input to amplifier 21A to a safe level, as shown by S104 in FIGS. 2B and 2C. By a safe level, it is meant that pump power from pump source 46A has a level such that amplifier 21A would, with an input signal, produce output power within Class 1 as defined by IEC 60825-1, that is, less than 10 mW. As has been mentioned, each line amplifier may alternatively be dropped to a safe level in response to a SafetyShutdown signal received from supervisory and control circuit 44 (S102 in FIGS. 2B and 2C).

In accordance with the present invention, the method for shutting down optical communication system 10 further includes the step S106 in FIG. 2C of decreasing pump power for corresponding westbound optical amplifier 21B within amplifier site 21 below the predetermined safety level. Amplifiers of the eastbound and westbound spans are commonly supervised and controlled through circuit 44 so that a loss of input power to amplifier 21A can be communicated to the pump source for amplifier 21B, and vice versa. Similar to the approach taken with shutting down pump source 46A for amplifier 21A, circuit 44 shuts down or substantially reduces the output power from pump source 46B for amplifier 21B operating in the westbound direction.

Figure 2C:
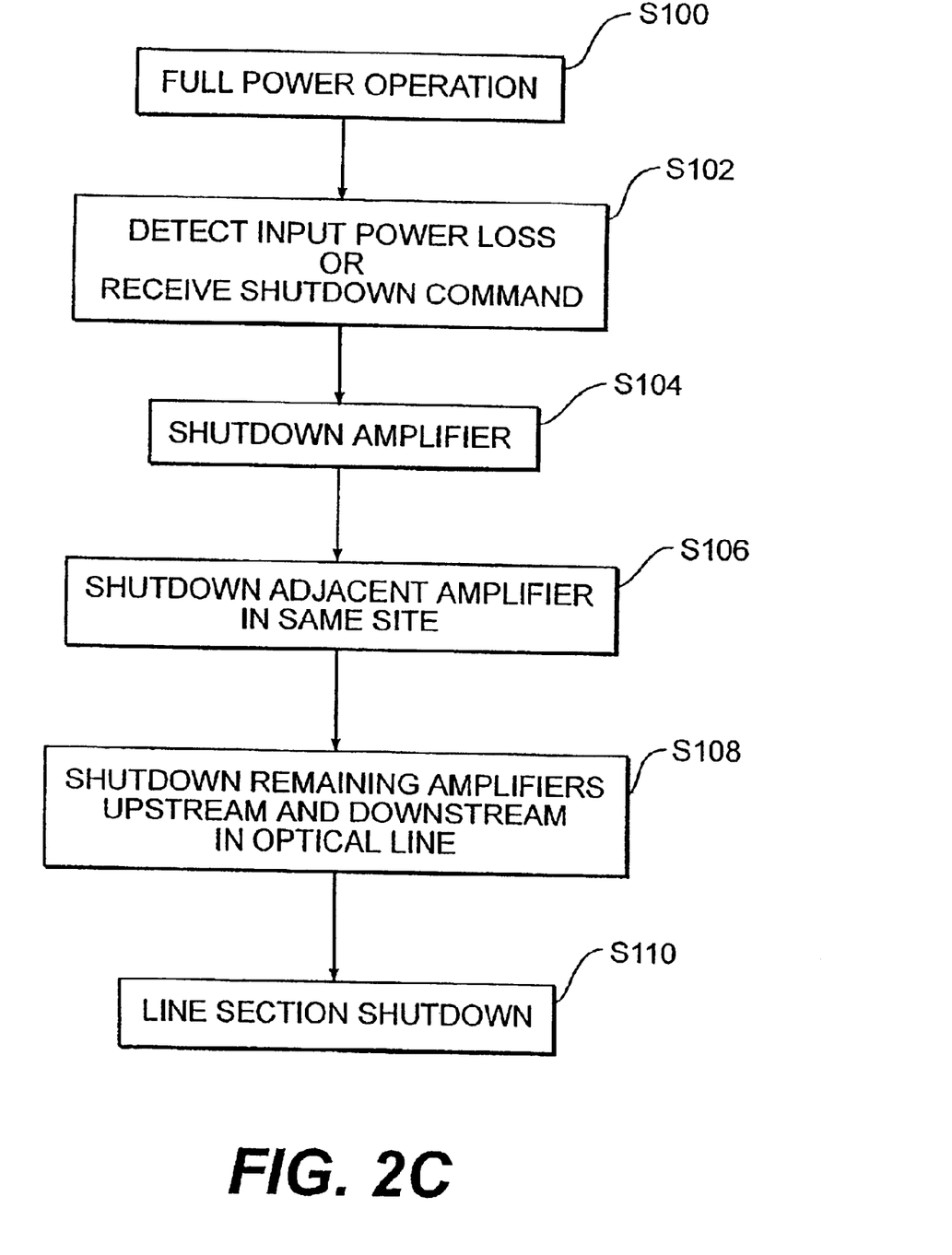
FIG. 2C is a flowchart of a shutdown procedure for several amplifiers in an optical line within the optical communication system of FIG. 1 consistent with an embodiment of the present invention.
Figure 3:
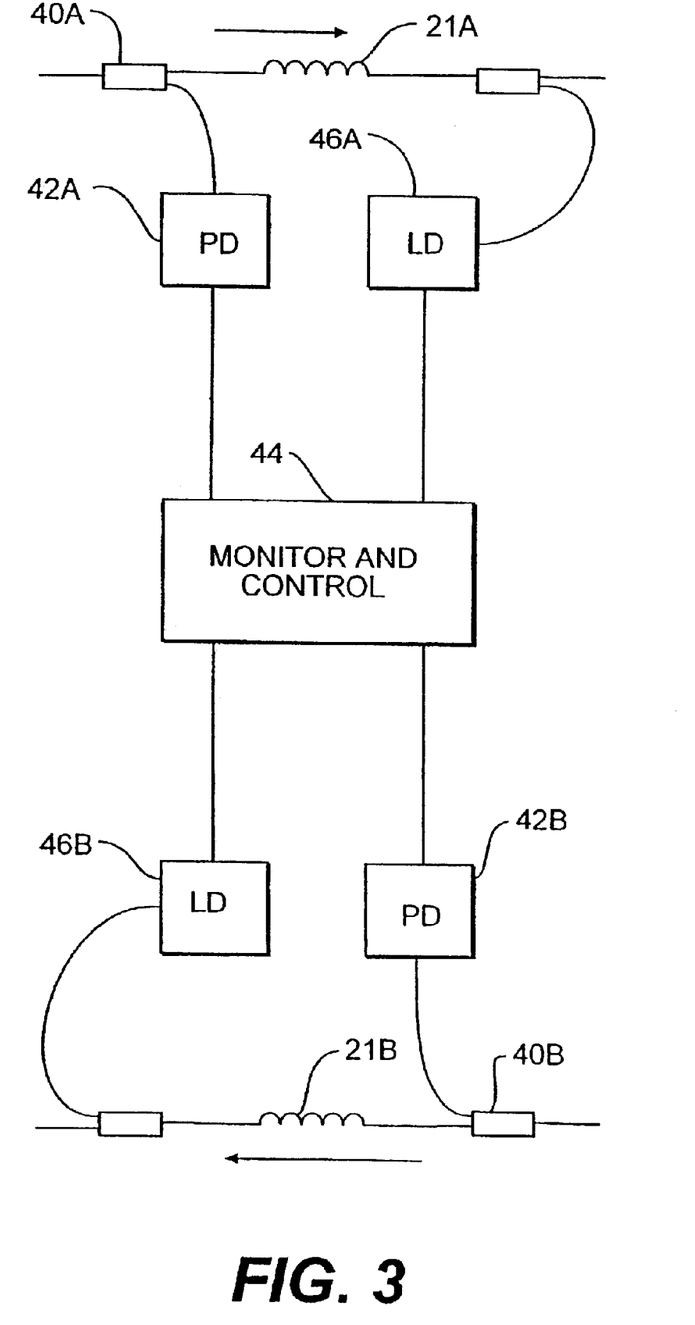
FIG. 3 is a block diagram of monitor and control circuitry for amplifiers within the optical communication system of FIG. 1 consistent with an embodiment of the present invention.

After amplifier 21B shuts off or substantially decreases its output power, amplifier 20B within a next downstream westbound amplifier site 20 will detect this loss of optical power on fiber 16B, as shown in steps S108 and S102 in FIG. 2C. When the photodiode and circuit coupled to the input of amplifier 20B registers a drop in signal power below the threshold value, which depends on the configuration of the implemented amplifier and overall system but may be on the order of –20 dBm, the supervisory and control circuit 44 waits for the set period of delay and then shuts down or decreases substantially the pump power for amplifier 20B. This deactivation of fiber amplifier 20B occurs in a similar method to that which occurs originally for amplifier 21A.

Upon the deactivation of amplifier 20B, supervisory and control circuit 44 communicates to corresponding amplifier 20A within amplifier site 20 to decrease pump power for communication in the eastbound direction. This deactivation of amplifier 20A occurs in a similar fashion to that followed for amplifier 21B using control circuit 44. As a result, amplifier 20A, which feeds optical power to the site of fiber disruption at location X, is effectively shut off, which forces location X into a safe condition for maintenance personnel. In the preceding process, the four optical amplifiers 20A, 21A, 21B, and 20B surrounding fiber disruption X are rapidly disabled within one second as required by governing standards in IEC 60825-2.

Conventional automatic protection for optical communication systems requires deactivation of only amplifiers 20A and 21B to effect an interlock of power surrounding fiber disruption at location X. This technique as disclosed in U.S. Pat. No. 5,428,471 and ITU Recommendation G.958, requires the input at amplifier 21A to detect the loss of optical power and to only cause shutdown of amplifier 21B within common site 21, for example. Similarly, these prior protection systems required amplifier 20B to recognize the loss of input power on fiber 16B and only to cause shutdown of corresponding amplifier 20A within common site 20, for example.

Applicants have discovered, however, that this method of rapid isolation of fiber disruption X while maintaining the operation of other amplifiers within communication system 10 risks creation of high power optical pulses upon the restart of the communication link. Applicants have observed that when amplifiers such as those in amplifier site 22 continue to receive pump power without also receiving an input signal, these amplifiers quickly accumulate amplified spontaneous emission (ASE) where all the pump power available is used by the amplifier to generate ASE. Upon recovery from the failure at location X, optical signals are again coupled into the amplifier input, for example, at amplifier 22A. If amplifier 22A is in this ASE condition so that a high gain is available for amplifier 22A, high power peak outputs are generated. In a series of tests, an optical channel at the input of a transmission line comprising erbium doped fiber optical amplifiers was amplitude modulated at a frequency of about 400 Hz. The average output power from the amplifiers in the line was of 17.5 dBm. High power pulses with a peak power of about 33.5 dBm (i.e., greater than 2 W) were measured at the output of the second amplifier along the telecommunication line. These high power peaks are potentially dangerous, for example, to photodiodes receiving optical signals downstream from amplifier 22A for monitoring purposes and to optical connectors along the transmission line.

Accordingly, the method of shutting down optical communication system 10 includes a step of decreasing or shutting off pump power for the remaining optical amplifiers in both eastbound and westbound directions within the optical line containing fiber disruption X. By the optical line, it is meant the section of system 10 both upstream and downstream from fiber disruption X that transmits the WDM telecommunication signals in a purely optical form and without changes to the WDM pattern. The ends of the optical line are defined by optical transformation sites, such as a transmitter, a receiver, an ADM, or an opto-electronic regenerator. It is understood that other devices not listed above that transform the optical signal to an electrical signal or modify the WDM signal pattern also comprise an optical transformation site.

Referring to FIG. 1, the optical line inclusive of fiber disruption X is defined in the eastbound direction by TXT 12A and ADM 26 and in the westbound direction by ADM 26 and RXR 14B. The remaining amplifiers in this optical line in sites 18, 19, and 22 shut down following the same pattern described above for the amplifiers in sites 20 and 21. In particular, amplifier 22A will deactivate by detecting a loss of input power received from amplifier 21A. Amplifier 22B will deactivate upon receipt of a shutdown command via the supervisory and control system from amplifier 22A. Similar methods of deactivation will occur in amplifier sites 18 and 19 until all amplifiers 18-22 have shut down. This method of complete deactivation within an optical line can occur due to the shutdown of both amplifiers, for example, 21A and 21B within site 21 and both amplifiers 20A and 20B within site 20.

Alternatively, complete deactivation of all amplifiers within an optical line can occur under the direction of control circuit 44. If circuit 44 is a centralized monitoring and supervisory circuit such as a central computer for managing operation of system 10, control signals from circuit 44 can be provided to all amplifiers within the optical line along a common communication bus. These control signals, which for a preferred embodiment may be termed SafetyShutdown, can cause subsequent amplifiers like 22, 18, and 19 to shut down after circuit 44 has determined that a break at location X has occurred. In either implementation, all remaining amplifiers within the optical line decrease their output power to at least a safe level.

Amplifiers within other sites outside of the optical line containing the fiber disruption, such as amplifiers 23, can continue to operate during the shutdown. IEC 60825-2 mandates that the optical line be shut down after a failure within 1 sec. In a preferred implementation, shutdown of an optical line should occur in about 160 ms. After this complete shutdown of the optical line, maintenance personnel can repair safely the disruption at location X without concern that a restart of the optical line will cause damaging high power pulses to emanate from amplifiers at other sites within system 10.

The present invention further contemplates a method for starting up the optical communication system after the automatic protection system has shut it down. In general, the method for starting up the system enables a user to activate the system by manually forcing one terminal amplifier site to turn on in response to a SafetyOverride command, which leads to the successive activation of all other amplifiers within an optical line. That is, a SafetyOverride command is provided to the terminal site amplifier such as booster amplifier 18A in the optical line containing the fiber disruption after repair of the disruption. The terminal site amplifier will then turn on in a reduced power condition. Each following optical line amplifier, such as 19A, 20A, etc., will switch on in cascade in a reduced power condition upon receipt of optical power at its input. Each of the optical line amplifiers will ignore a SafetyShutdown command until a first period of time, for purposes of discussion called LineForcedOnTimer, has passed. If a fault in the line remains, one of the line amplifiers will not turn on, causing generation of a SafetyShutdown command that will turn off the optical line in a manner described above. If no fault is detected on the line after passage of a second period of time, for purposes of discussion called LaserPowerReducedTimer, each optical line amplifier will rise to its full operating power.

The shutdown command, such as SafetyShutdown described above or a local signal between amplifiers in a common site, indicates a need to shut down power to the optical line amplifiers and the booster amplifiers. As explained above, a disruption at location X in fiber 16A causes amplifier 21A to detect a loss of input power and trigger a shutdown command to amplifier 21B within the same amplifier site 21. In a first step of a method for starting-up the optical line, optical line amplifier 21B disregards the shutdown command received from amplifier 21A, while remaining in its shutdown condition. The same activity occurs for other optical line amplifiers, such as amplifiers 20B and 19B in the westbound direction.

The method of starting-up the optical line includes the step of beginning operation for the terminal site amplifier upstream from the fiber disruption either in response to a discontinuance of the SafetyShutdown command that has kept the terminal site amplifier inactive or in response to receipt of a separate SafetyOverride command. The SafetyOverride command, provided from supervisory and control circuit 44, provides a manual-type means of starting the optical line after its shutdown. In response to a SafetyOverride command or loss of a SafetyShutdown signal (S200 in FIG. 2A), the terminal site amplifier will begin operating in a reduced power condition S140 for a predetermined length of time. For example, in optical communication system 10 of FIG. 1, booster amplifier 18A may be forced to disregard the SafetyShutdown command that it receives from amplifier 18B after the fiber disruption at location X due to receipt of a SafetyOverride command. The pump source for booster amplifier 18A, however, is controlled to provide a reduced level of pump power to fiber amplifier 18A, causing this amplifier to operate at an output power level that qualifies as Class 3A under IEC 60825-1. Preferably, the reduced power condition or safety condition for booster amplifier 18A is where the output power level of between 10 mW and 50 mW (10 dBm to 17 dBm), and most preferably at a level of about 13 dBm.

Upon the powering up in a reduced power condition for the terminal site amplifier, two counters within system 10 begin. A first, for discussion purposes called LineForcedOnTimer, counts a predetermined period during which the terminal site amplifier operating in a reduced-power condition continues to ignore the SafetyShutdown command (S210 in FIG. 2A). In a preferred embodiment, the duration of LineForcedOnTimer exceeds the length of time for all amplifiers within the optical line to turn on their pump lasers. For instance, if each amplifier takes 100 ms to turn on after receiving a command to do so and the line has 28 amplifiers, then LineForcedOnTimer should exceed 2.8 sec. If after the expiration of LineForcedOnTimer the terminal site amplifier detects a SafetyShutdown command (S220), the terminal site amplifier again shifts to S110 and shuts down its pump laser.

The second counter, for discussion purposes called LaserPowerReducedTimer, counts a predetermined period during which the terminal site amplifier operating in a reduced-power condition waits to see if the optical line has a fault before advancing to a full power operating state (S230 and S100). In a preferred embodiment, LaserPowerReducedTimer is set to about 3 times the length of LineForcedOnTimer to ensure that ample time is provided to detect a remaining fault condition before an amplifier is elevated to its full power condition. LineForcedOnTimer and LaserPowerReducedTimer may be hardware or software timers implemented within supervisory and control circuit 44.

As amplifier 18A begins to operate in its reduced power condition and boosts optical signals received along fiber 16A from TXT 12A, amplifier 19A at separate amplifier site 19 will detect an increase in input signal power. As shown in FIG. 3, for optical line amplifier 21A, coupler 40A will separate a small portion of the optical signal received at the input to amplifier 19A and divert it to photodiode 42A and circuit 44. Within this circuitry, amplifier 19A will eventually detect a rise in input signal power above a predetermined threshold, which indicates that amplifier 19A should begin operating. This predetermined threshold for starting the optical line amplifiers such as 19A will depend on the type of optical amplifiers used and the configuration for system 10. After the optical line amplifier positioned immediately downstream from the booster amplifier 18A detects a sufficient increase in signal power (S130 in FIG. 2A), it begins to operate in a reduced power condition S140 similar to the reduced power condition for booster amplifier 18A. As with terminal site amplifier 18A, optical line amplifier 19A will also trigger counters called LineForcedOnTimer and LaserPowerReducedTimer to set a period for ignoring any SafetyShutdown command and for checking for removal of the fault while in a low power condition. This action is depicted at S140, S145, S150, S160, and S170 in FIG. 2A and follows a similar pattern as that followed for terminal site amplifier 18A.

After optical line amplifier 19A begins operating in a reduced power condition, amplifier 20A within amplifier site 20 soon also begins to operate in a similar manner. That is, amplifier 20A soon detects optical input power above its preset threshold and supplies pump power to the erbium-doped fiber at a sufficient level to generate output optical power around 13 dBm. Each of the optical line amplifiers within the optical line sequentially turns on in a cascade fashion thereafter.

After a period of time, the entire optical line in an eastbound direction, for example, will be operating at a reduced power level. In accordance with the present invention, the optical communication system 10 waits for each amplifier for a length of time LaserPowerReducedTimer to determine if the fiber disruption at X has been repaired and if the entire system can be elevated to a full power condition. Thus, as each optical line amplifier transitions from a shutdown condition to its reduced power condition, it begins LaserPowerReducedTimer to count a period for remaining in the reduced power condition. After expiration of the timer, the optical line amplifiers and the booster line amplifiers individually transition to a full power condition, as shown in S170. As with the terminal site amplifier, a preferred length for LaserPowerReducedTimer is about 3 times the length of LineForcedOnTimer. In its full power condition, each of the amplifiers in the optical line preferably operates at a power condition within Class 38. When the amplifiers transition to their full power condition, however, they again become susceptible and responsive to a shutdown command from the corresponding amplifier within the same amplifier site. Thus, if the original fiber disruption has not been fully repaired, the original shutdown commands will again deactivate the fiber amplifiers and shut down the optical fiber line.

In summary, Applicants have identified deficiencies in existing methods for shutting down and starting up an optical communication system and discovered improved techniques for ensuring rapid and safe operation of a system after fiber breakage occurs. Current methods for interlocking amplifiers permits remaining amplifiers in a line to build up ASE that can result in dangerous large optical pulses when the system is restarted. The present invention overcomes the prior disadvantages by using amplifiers with various modes of safety operation and coordinating the shutdown and startup of amplifiers within an optical line. Start up of the system can take place by simply forcing a terminal site amplifier within a failed optical line to turn on with a SafetyOverride command. This action causes a cascading of powering-up for the chain of amplifiers in the optical line and the triggering of several supervisory timers to ensure safe start-up of the line.

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A method of deactivating an optical communication system comprising:
   transmitting, from a control circuit, a plurality of control signals to a plurality of optical amplifiers, the control signals transmitted along a control bus coupling the control circuit to the optical amplifiers and the control signals including a safety shutdown signal and a shutdown override signal;
   detecting a decrease in an optical signal at an input to a first optical amplifier;
   activating, using the control circuit, the safety shutdown signal in response to the decrease in the optical signal;
   decreasing a pump power of a plurality of other optical amplifiers in response to the safety shutdown signal;
   activating, using the control circuit, the shutdown override signal at least a predetermined period of time after activating the safety shutdown signal; and
   forcing a second optical amplifier to disregard the safety shutdown signal while the shutdown override signal is activated.

2. The method of claim 1, wherein detecting a decrease in the optical signal comprises:
   extracting a portion of the optical signal at the input of the first optical amplifier; and
   comparing the portion to a threshold value.

3. The method of claim 1, wherein detecting a decrease in the optical signal comprises:
   detecting at a first time a decrease in the optical signal;
   waiting a predetermined period of time after detecting at the first time; and
   detecting at a second time the decrease in the optical signal.

4. The method of claim 1, wherein decreasing a pump power of the optical amplifiers comprises decreasing the pump power below a predetermined safety threshold.

5. The method of claim 1, wherein the optical signal comprises a first optical signal, and further comprising:
   detecting a decrease in a second optical signal at an input to a third optical amplifier, wherein the input to the third optical amplifier is operable to receive optical signals from an output of the first optical amplifier;
   decreasing a pump power of the third optical amplifier in response to the decrease in the second optical signal; and
   forcing the third optical amplifier to disregard the safety shutdown signal for the predetermined period of time.

6. The method of claim 1, wherein the predetermined period of time comprises a first predetermined time period and wherein activating the shutdown override signal further comprises activating the shutdown override signal for a second predetermined period of time that is determined based on an amount of time needed for the optical amplifier to attain a predetermined safe power level.

7. A method of activating an optical communication system comprising:
   transmitting, from a control circuit, a plurality of control signals to a plurality of optical amplifiers, the control signals transmitted along a control bus coupling the control circuit to the optical amplifiers and the control signals including a safety shutdown signal and a shutdown override signal;
   activating the shutdown override signal;
   forcing a first optical amplifier to disregard the safety shutdown signal in response to activation of the shutdown override signal;
   operating the first optical amplifier at a first power level;
   activating the safety shutdown signal if a signal power of the optical signal received at a second optical amplifier is less than a predetermined threshold;
   deactivating the shutdown override signal at least a predetermined period of time after activating the shutdown override signal; and
   operating, after the shutdown override signal has been deactivated, the first optical amplifier at a second power level if the safety shutdown signal is not activated, wherein the second power level is higher than the first power level.

8. The method of claim 7, wherein the input to a second optical amplifier is operable to receive optical signals from the first optical amplifier.

9. The method of claim 7, further comprising repeating the steps of claim 7 for a plurality of other optical amplifiers optically coupled to the second optical amplifier.

10. The method of claim 7, wherein the predetermined period of time is determined based on an amount of time required for the first optical amplifier to attain the first power level.

11. A system for optical communication comprising:
    a first optical transformation site;
    a second optical transformation site;
    a plurality of optical amplifiers coupled serially between the first and second optical transformation sites, wherein the first optical transformation site couples to an input of one of the optical amplifiers and the second optical transformation site couples to an output of one of the optical amplifiers, and wherein each of the optical amplifiers is operable to:
      receive a signal at an input of the optical amplifier;
      decrease a pump power of the optical amplifier in response to a safety shutdown signal; and
      disregard the safety shutdown signal while a shutdown override signal is activated;
    a control bus coupling the optical amplifiers to a control circuit; and
    the control circuit operable to:
      transmit control signals along the control bus to the plurality of optical amplifiers, the control signals including the safety shutdown signal and the shutdown override signal;
      detect a decrease in the optical signal received at the input of one of the optical amplifiers;
      activate the safety shutdown signal in response to detecting the decrease;
      activate the shutdown override signal at least a first predetermined period of time after activating the safety shutdown signal;
      deactivate the safety shutdown signal if a signal power received at the input of each of the plurality of optical amplifiers is above a predetermined threshold; and deactivate the shutdown override signal at least a second predetermined period of time after activating the safety shutdown signal.

12. The system of claim 11, wherein each of the optical amplifiers is further operable to:
increase the pump power of that optical amplifier to a first predetermined level;
verify that the safety shutdown signal is deactivated after a third predetermined period of time; and
increase the pump power of that optical amplifier to a second predetermined level in response to the verification, wherein the second predetermined level is greater than the first predetermined level.

13. The system of claim 11, wherein the control circuit is further operable to detect a decrease by:
extracting a portion of the signal at the input of one of the optical amplifiers; and
comparing the portion to a threshold value.

14. The system of claim 11, wherein the control circuit is further operable to:
detect at a first time a decrease in the optical signal;
wait a second predetermined period of time; and
detect at a second time the decrease in the optical signal.

15. The system of claim 11, wherein each of the optical amplifiers is further operable to decrease the pump power below a predetermined safety threshold.

16. The system of claim 11, wherein the first predetermined period of time is determined based on an amount of time required for all of the optical amplifiers to attain the first power level.

17. A system for optical communication comprising:
a first optical transformation site;
a second optical transformation site;
a control circuit operable to:
activate a safety shutdown signal;
activate a shutdown override signal a first predetermined amount of time after activating the safety shutdown signal;
deactivate the safety shutdown signal if a signal power of the optical signal received at each of a plurality of optical amplifiers is greater than a predetermined threshold; and
deactivate the shutdown override signal at least a second predetermined amount of time after activating the shutdown override signal;
a control bus coupling the control circuit to a plurality of optical amplifiers; and
the plurality of optical amplifiers coupled serially between the first and second optical transformation sites, wherein the first optical transformation site couples to an input of one of the optical amplifiers and the second optical transformation site couples to an output of one of the optical amplifiers, and wherein each of the optical amplifiers is operable to:
disregard the safety shutdown signal while the shutdown override signal is activated;
increase a pump power of the optical amplifier to a first power level;
verify an absence of the safety shutdown signal after a predetermined period of time; and
increase the pump power of the optical amplifier to a second power level in response to verifying the absence of the shutdown signal, wherein the second power level is higher than the first power level.

18. The system of claim 17, wherein the control circuit is further operable to detect an increase by:
extracting a portion of the signal at the input of one of the optical amplifiers; and
comparing the portion to a threshold value.

19. The system of claim 17, wherein the control circuit is further operable to detect an increase by:
detecting at a first time an increase in a signal;
waiting for a second predetermined period of time; and
determining that at a second time the increase in the signal.

20. The system of claim 17, wherein the second predetermined amount of time is determined based on an amount of time required for the plurality of optical amplifiers to attain the first power level.

21. Logic for activating an optical communications system, the logic embodied in a computer-readable media and operable to perform the steps of:
transmitting, from a control circuit, a plurality of control signals to a plurality of optical amplifiers, the control signals transmitted along a control bus coupling the control circuit to the optical amplifiers and the control signals including a safety shutdown signal and a shutdown override signal;
activating the shutdown override signal, the shutdown override signal instructing a first optical amplifier to disregard the safety shutdown signal;
activating the safety shutdown signal if a signal power of an optical signal received at a second optical amplifier is less than a predetermined threshold, the safety shutdown signal instructing the first optical amplifier to decrease a pump power of the first optical amplifier; and
deactivating the shutdown override signal at least a predetermined period of time after activating the shutdown override signal.

22. The logic of claim 21, further operable to repeat the steps of claim 34 for a plurality of other optical amplifiers optically coupled to the second optical amplifier.

23. The logic of claim 21, wherein the logic is further operable to determine the predetermined period of time based on an amount of time required for the first optical amplifier, the second optical amplifier and the plurality of other optical amplifiers to attain the first power level.

24. Logic for deactivating an optical communications system, the logic embodied in a computer-readable media and operable to perform the steps of:
transmitting, from a control circuit, a plurality of control signals to a plurality of optical amplifiers, the control signals transmitted along a control bus coupling the control circuit to the optical amplifiers and the control signals including a safety shutdown signal and a shutdown override signal;
detecting a decrease in an optical signal at an input to a first optical amplifier;
activating, using the control circuit, the safety shutdown signal in response to the decrease in the optical signal, the safety shutdown signal instructing a second optical amplifier to decrease a pump power of the second optical amplifier;
activating, using the control circuit, the shutdown override signal at least a first predetermined period of time after activating the safety shutdown signal, the shutdown override signal instructing the second optical amplifier to ignore the safety shutdown signal;
deactivating, using the control circuit, the safety shutdown signal if the optical signal received at the first optical amplifier is greater than a predetermined threshold; and deactivating, using the control circuit, the shutdown override signal at least a second predetermined amount of time after activating the shutdown override signal.

25. The logic of claim 24, wherein the logic is operable to detect a decrease in the optical signal by:

extracting a portion of the optical signal at the input of the first optical amplifier; and comparing the portion to a threshold value.

26. The logic of claim 24, wherein the logic is operable to detect a decrease in the optical signal by:

detecting at a first time a decrease in the optical signal;

waiting a third predetermined period of time after detecting for the first time; and detecting at a second time the decrease in the optical signal.

27. The logic of claim 24, wherein the logic is further operable to activate the safety shutdown signal by activating, using the control circuit, the safety shutdown signal, the safety shutdown signal instructing the second optical amplifier to decrease the pump power of the second optical amplifier by decreasing the pump power below a predetermined safety threshold.

28. The logic of claim 24, wherein the optical signal comprises a first optical signal, and the logic is further operable to perform the steps of:

detecting a decrease in a second optical signal at an input to a third optical amplifier, wherein the input to the third optical amplifier is operable to receive optical signals from an output of the first optical amplifier;

decreasing a pump power of the third optical amplifier in response to the decrease in the second optical signal; and forcing the third optical amplifier to disregard the safety shutdown signal for the predetermined period of time.

29. The logic of claim 24, wherein the logic is further operable to determine the first predetermined period of time based on an amount of time needed for the optical amplifier to attain a predetermined safe power level.

30. An optical communication system, comprising:

means for transmitting, from a control circuit, a plurality of control signals to a plurality of optical amplifiers, the control Bignals transmitted along a control bus coupling the control circuit to the optical amplifiers and the control signals including a safety shutdown signal and a shutdown override signal;

means for detecting a decrease in an optical signal at an input to a first optical amplifier;

means for activating, using the control circuit, the safety shutdown signal in response to the decrease in the optical signal;

means for decreasing a pump power of a second optical amplifier in response to the safety shutdown signal;

means for activating, using the control circuit, the shutdown override signal at least a predetermined period of time activating the safety shutdown signal; and means for forcing the second optical amplifier to disregard the safety shutdown signal while the shutdown override signal is activated.

31. An optical communication system, comprising:

means for transmitting, from a control circuit, a plurality of control signals to a plurality of optical amplifiers, the control signals transmitted along a control bus coupling the control circuit to the optical amplifiers and the control signals including a safety shutdown signal and a shutdown override signal;

means for activating the shutdown override signal;

means for forcing a first optical amplifier to disregard the safety shutdown signal in response to activation of the shutdown override signal;

means for operating the first optical amplifier at a first power level;

means for activating the safety shutdown signal if a signal power of the optical signal received at a second optical amplifier is less than a predetermined threshold;

means for deactivating the shutdown override signal a predetermined period of time after activating the shutdown override signal; and means for operating, after the shutdown override signal has been deactivated, the first optical amplifier at a second power level if the safety shutdown signal is not activated, wherein the second power level is higher than the first power level.

32. An apparatus for controlling transmission of optical signals comprising:

a control bus, operable to couple a control circuit to a plurality of optical amplifiers; and the control circuit operable to:

transmit a plurality of control signals to the plurality of optical amplifiers, the control signals including a safety shutdown signal and a shutdown override signal;

detect a decrease in an optical signal at an input to one of the optical amplifiers;

activate the safety shutdown signal in response to the decrease in the optical signal;

activate the shutdown override signal at least a first predetermined period of time after activating the safety shutdown signal;

deactivate the safety shutdown signal if the optical signal at the input to all of the optical amplifiers is greater than a predetermined threshold; and deactivate the shutdown override signal at least a second predetermined time after activating the shutdown override signal.

33. The apparatus of claim 32, wherein the control circuit is operable to detect the decrease by:

extracting a portion of the optical signal at the input of the optical amplifier; and comparing the portion to a threshold value.

34. The apparatus of claim 32, wherein the control circuit is operable to detect the decrease by:

detecting for a first time a decrease in the optical signal;

waiting a second predetermined period of time after detecting for the first time; and detecting for a second time a decrease in the optical signal.

* * * * *